United States Patent
Leborgne et al.

(10) Patent No.: US 9,636,974 B2
(45) Date of Patent: May 2, 2017

(54) DEVICE FOR THERMALLY CONDITIONING FLUID FOR A MOTOR VEHICLE AND CORRESPONDING HEATING AND/OR AIR CONDITIONING APPARATUS

(71) Applicant: Valeo Systemes Thermiques, Le Mesnil Saint Denis (FR)

(72) Inventors: Jose Leborgne, Elancourt (FR); Zhenxia Ma, Montigny le Bretonneux (FR); Frederic Pierron, Rambouillet (FR); Laurent Tellier, Paris (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 80 days.

(21) Appl. No.: 14/431,453

(22) PCT Filed: Sep. 24, 2013

(86) PCT No.: PCT/EP2013/069878
§ 371 (c)(1),
(2) Date: Mar. 26, 2015

(87) PCT Pub. No.: WO2014/048933
PCT Pub. Date: Apr. 3, 2014

(65) Prior Publication Data
US 2015/0251519 A1    Sep. 10, 2015

(30) Foreign Application Priority Data

Sep. 28, 2012   (FR) ...................................... 12 59164

(51) Int. Cl.
*H05B 3/78*    (2006.01)
*F24H 1/10*    (2006.01)
(Continued)

(52) U.S. Cl.
CPC ........... *B60H 1/2221* (2013.01); *F24H 1/102* (2013.01); *F24H 1/121* (2013.01)

(58) Field of Classification Search
None
See application file for complete search history.

(56) References Cited

U.S. PATENT DOCUMENTS 1,671,677 A * 5/1928 Keeton .................. F24H 1/142
                                                    392/489
2,060,936 A * 11/1936 Haag, Jr. ................. F28D 7/026
                                                    137/340
(Continued)

FOREIGN PATENT DOCUMENTS

CN     201685752        12/2010
CN     201685752 U     12/2010
(Continued)

OTHER PUBLICATIONS

International Search Report for Application No. PCT/EP2013/069878 dated Nov. 3, 2014, 7 pages.
(Continued)

*Primary Examiner* — Thor Campbell
(74) *Attorney, Agent, or Firm* — Howard & Howard Attorneys PLLC (57) ABSTRACT

The invention relates to a device for thermally conditioning a fluid for a motor vehicle, comprising: at least one heat module comprising a core and a shell defining a circuit for guiding the fluid that is to be heated or cooled between the core and the shell, a fluid inlet box (209*a*) and a fluid outlet box, the inlet box (209*a*) having at least one fluid inlet canal (225*a*, 225*b*) communicating with the fluid guiding circuit. According to the invention, the fluid inlet canal (225*a*, 225*b*) has at least one substantially curved portion which is configured to generate a swirling movement in the fluid. The (Continued)

invention also relates to a heating and/or air conditioning apparatus comprising such a device.

16 Claims, 5 Drawing Sheets

(51) Int. Cl.
    *B60H 1/22*     (2006.01)
    *F24H 1/12*     (2006.01)

(56) References Cited

U.S. PATENT DOCUMENTS

| | | | | |
|---|---|---|---|---|
| 2,228,004 A * | 1/1941 | Ewing | | F24H 1/142 |
| | | | | 392/462 |
| 2,775,683 A * | 12/1956 | Kleist | | F25B 43/00 |
| | | | | 222/146.3 |
| 3,090,376 A | 5/1963 | Chambers | | |
| 3,943,325 A * | 3/1976 | Pickard | | B60K 11/02 |
| | | | | 123/142.5 E |
| 4,286,140 A * | 8/1981 | Dewulf | | F24H 9/2014 |
| | | | | 165/156 |
| 4,300,870 A * | 11/1981 | Cox | | A47J 31/542 |
| | | | | 392/471 |
| 4,360,059 A * | 11/1982 | Funke | | F28D 7/026 |
| | | | | 165/160 |
| 4,372,260 A * | 2/1983 | Baker | | B01D 35/18 |
| | | | | 123/142.5 E |
| 4,458,642 A * | 7/1984 | Okubo | | F01M 13/00 |
| | | | | 123/196 AB |
| 4,480,172 A * | 10/1984 | Ciciliot | | F22B 1/288 |
| | | | | 165/140 |
| 4,563,571 A * | 1/1986 | Koga | | H05B 3/42 |
| | | | | 219/543 |
| 4,770,134 A * | 9/1988 | Foreman | | F02N 19/10 |
| | | | | 123/142.5 R |
| 5,265,318 A * | 11/1993 | Shero | | B23P 11/025 |
| | | | | 15/321 |
| 5,806,479 A * | 9/1998 | Bauer | | B60H 1/032 |
| | | | | 123/142.5 R |
| 5,855,319 A * | 1/1999 | Burner | | B60H 1/032 |
| | | | | 237/12.3 B |
| 6,724,983 B1 * | 4/2004 | Humburg | | B60H 1/22 |
| | | | | 165/41 |
| 7,286,752 B2 * | 10/2007 | Gourand | | A47J 31/542 |
| | | | | 392/465 |
| 7,574,987 B2 * | 8/2009 | Preiholt | | F02N 19/10 |
| | | | | 123/142.5 E |
| 8,249,437 B2 * | 8/2012 | Commette | | F24H 1/102 |
| | | | | 29/432 |
| 8,554,063 B2 * | 10/2013 | Hsu | | F22B 1/28 |
| | | | | 122/40 |
| 8,577,211 B2 * | 11/2013 | Lucker | | F24H 1/142 |
| | | | | 392/470 |
| 8,724,978 B2 * | 5/2014 | Furumura | | F22B 1/28 |
| | | | | 392/484 |
| 8,731,386 B2 * | 5/2014 | Waechter | | F24H 1/009 |
| | | | | 392/479 |
| 9,119,232 B2 * | 8/2015 | Clauss | | H05B 3/24 |
| 9,127,762 B2 * | 9/2015 | Oh | | F16H 57/0413 |
| 9,161,391 B2 * | 10/2015 | Niederer | | H05B 3/24 |
| 9,295,108 B2 * | 3/2016 | Bohlender | | H05B 3/24 |
| 9,362,740 B1 * | 6/2016 | Elnar | | A61H 33/0095 |
| 9,435,562 B2 * | 9/2016 | Giffels | | F24H 1/103 |
| 2006/0196448 A1 * | 9/2006 | Hayworth | | B60S 1/488 |
| | | | | 122/6.6 |
| 2007/0284457 A1 * | 12/2007 | Shank | | B05B 9/002 |
| | | | | 239/135 |
| 2008/0053981 A1 * | 3/2008 | Adachi | | H05B 3/50 |
| | | | | 219/202 |
| 2008/0138052 A1 * | 6/2008 | Wu | | B60S 1/487 |
| | | | | 392/465 |
| 2009/0107974 A1 * | 4/2009 | Testa | | B60H 1/034 |
| | | | | 219/208 |
| 2011/0180617 A1 * | 7/2011 | Saito | | B60H 1/2221 |
| | | | | 236/49.3 |
| 2012/0055913 A1 * | 3/2012 | Huang | | B60S 1/488 |
| | | | | 219/202 |

FOREIGN PATENT DOCUMENTS

| | | |
|---|---|---|
| EP | 0 418 179 | 3/1991 |
| EP | 0 418 179 A1 | 3/1991 |
| EP | 1 669 688 A1 | 6/2006 |
| FR | 809 123 | 2/1937 |
| FR | 809 123 A | 2/1937 |
| WO | WO 93/02722 A1 | 2/1993 |
| WO | WO 98/14736 A1 | 4/1998 |

OTHER PUBLICATIONS

English language abstract and machine-assisted English translation for CN 201685752 extracted from espacenet.com database on Apr. 6, 2015, 9 pages.

English language abstract and machine-assisted English translation for EP 0 418 179 extracted from espacenet.com database on Apr. 6, 2015, 11 pages.

Machine-assisted English translation for FR 809 123 extracted from espacenet.com database on Apr. 6, 2015, 6 pages.

* cited by examiner

Fig. 9

DEVICE FOR THERMALLY CONDITIONING FLUID FOR A MOTOR VEHICLE AND CORRESPONDING HEATING AND/OR AIR CONDITIONING APPARATUS

RELATED APPLICATIONS

This application is the National Stage of International Patent Application No. PCT/EP2013/069878, filed on Sep. 24, 2013, which claims priority to and all the advantages of French Patent Application No. FR 12/59164, filed on Sep. 28, 2012, the content of which is incorporated herein by reference.

The invention relates to a device for thermally conditioning fluid, such as an electrical heating device for fluid for a motor vehicle. The invention also applies more particularly to heating and/or air conditioning apparatuses for motor vehicles including such a heating device.

The reheating of the air intended for heating the interior is customarily assured by the passage of a flow of air through a heat exchanger, more specifically by a thermal exchange between the flow of air and a fluid. The fluid is generally a coolant in the case of an internal combustion engine.

Such a method of heating may prove to be unsuitable or inadequate to guarantee heating of the interior of a motor vehicle as well as demisting and defrosting.

However, a method for the rapid and efficient heating of the interior of the vehicle, in particular in order to ensure reheating of the interior, or for the defrosting or demisting of the vehicle prior to its use in a very cold environment, or also when a very rapid increase in the temperature is desired.

In addition, in the case of an electric vehicle, the heating function is no longer realized by the circulation of the coolant inside the thermal exchanger. It is possible, however, to provide a water circuit for heating the interior, although this method of heating may also prove to be unsuitable or inadequate to guarantee the rapid and efficient heating of the interior of the vehicle.

Furthermore, the use in the electric vehicle of an air conditioning loop functioning in heat pump mode is also familiar in order to reduce the space taken up by and the cost of a supplementary water circuit. The air conditioning loop conventionally permitting a flow of air to be cooled with the help of a coolant is thus utilized in this case in such a way as to reheat the flow of air. In order to achieve this, it is necessary to utilize an evaporator of the air conditioning loop as a condenser.

However, this method of heating may also prove to be unsuitable or inadequate. In fact, the performance of the air conditioning loop in heat pump mode depends on the external climatic conditions. For example, this air cannot be used as a source of thermal energy when the external air temperature is too low.

A known solution involves the connection of an additional electrical heating device to the thermal exchanger or to the water circuit or even to the air conditioning loop.

The additional electrical heating device may be adapted in order to provide the upstream heating of the fluid, such as the coolant for the internal combustion engine, or the water present in the water circuit for heating the interior of the electric vehicle, or even the refrigerant fluid in the air conditioning loop.

In a manner known per se, the additional electrical heating device includes one or a plurality of heating modules in contact with the fluid to be heated.

More precisely, a heating module includes a core and a heating element produced in the form of a cylindrical shell surrounding the core, in order to define a circuit for guiding the fluid between the core and the cylindrical shell. The cylindrical shell is thus the source of thermal energy.

According to one known solution, a heating element exhibits electrical means, for example for heating one or a plurality of heating resistors produced by screen printing in the form of resistive tracks on the external surface of the heating element.

However, an axial circulation of the fluid inside the guiding circuit between the core and the cylindrical shell reduces the thermal transfer between the cylindrical shell and the fluid.

In order to increase the output of the thermal exchange between the heating element and the fluid circulating between the core and the cylindrical shell, it is accordingly preferable to prevent the circulation of the fluid parallel to the axis of the heating element in the form of a cylindrical element.

A known solution is to generate a helicoidal movement of the fluid circulating in the guiding circuit. The thermal exchange between the heating element, for example in the form of a cylindrical shell, and the fluid circulating in the interior of this cylindrical shell is increased in this way.

It has therefore been proposed that the core should exhibit a substantially helicoidal groove on its external surface. As a result, the design of such a core is complicated in nature.

This helicoidal groove permits a swirling movement to be imparted to the fluid. However, a lack of homogeneity in the speeds at the inlet to the circuit for guiding the fluid and a high drop in pressure have been observed with such a solution.

The aim of the invention is thus to propose a device for thermal conditioning, in particular a device for electrical heating having an improved output.

For this purpose, the invention has as its object a device for the thermal conditioning of a fluid for a motor vehicle, comprising:
  at least one thermal module comprising a core and a shell defining a circuit for guiding the fluid that is to be heated or cooled between the core and the shell,
  a fluid inlet box and a fluid outlet box, the inlet box having at least one inlet channel for the fluid communicating with the circuit for guiding the fluid,
  characterized in that the inlet channel for the fluid has at least one substantially curved portion which is configured in order to generate a swirling movement in the fluid.

It is accordingly possible to create swirling of the fluid "naturally", immediately ahead of the arrival of the fluid in the guiding circuit. The addition of helices that are realized on the external surface of the core of the thermal module or any other component part facilitating the creation of swirling of the fluid is optional.

The swirling movement of the fluid continues in the guiding circuit along the entire length of the core in such a way as to improve the thermal transfer between the fluid and the shell surrounding the core.

In the case of a heating device, the device imparts to the fluid a maximum amount of thermal energy produced by the cylindrical shell, for example, although the system can be applied equally well in order to remove heat from the fluid.

Such a device is capable of functioning for several hours.

This device also possesses the advantage of producing few losses of pressure in the fluid circuit at rates of flow of as much as 1000 l/h or even 2500 l/h.

The device may include in addition one or more of the following characterizing features, either individually or in combination:

the inlet channel includes a guide ramp for the fluid of substantially helicoidal form around an axis that is substantially parallel to a longitudinal axis of the thermal module, the shape of the ramp in particular making it possible to maintain or even to amplify the swirling movement;

the inlet channel exhibits a shape that is substantially in the form of an elbow;

the inlet box comprises at least one feed bowl having a substantially cylindrical shape fluidly connected to the guiding circuit of a thermal module;

said device includes at least two thermal modules arranged side by side in parallel, and the inlet channel exhibits a portion that is tangential to the two feed bowls of the inlet box;

said device includes at least two thermal modules arranged side by side in parallel and two fluid inlet channels communicating respectively with a guiding circuit of a thermal module;

said device comprises two conduits separated by a separating wall in such a way as to define the two fluid inlet channels;

said conduits respectively include an extremity communicating fluidly with an associated circuit for guiding the fluid and exhibiting a guide ramp for the fluid of substantially helicoidal form around an axis that is substantially parallel to a longitudinal axis of the thermal module;

the two conduits exhibit a common fluid inlet header, and in which the two conduits and the common fluid inlet header are realized integrally with the inlet box;

the two conduits are formed integrally with the inlet box;

the inlet box exhibits a fluid inlet manifold arranged radially in relation to a longitudinal axis of a thermal module;

the core of a thermal module includes a core body, defined around which is the circuit for guiding the fluid and an inlet extremity accommodated inside a cavity of the inlet box, said device comprising deflectors disposed between the core body and the inlet extremity of the core;

the deflectors are arranged radially in relation to a longitudinal axis of the thermal module;

the deflectors are arranged in the direction of swirling of the fluid generated by the fluid inlet channel;

the deflectors are realized integrally with the core;

the inlet box comprises the deflectors;

said device is arranged in a circuit for heating the interior of said vehicle.

The invention likewise relates to a heating and/or air conditioning apparatus for a motor vehicle, characterized in that it includes a thermal conditioning device as defined previously.

Other characterizing features and advantages of the invention will be appreciated more clearly on reading of the following description, which is given by way of illustrative and non-restrictive example, and from the accompanying drawings, in which:

FIG. 3b is a view in cross section of the inlet box in FIG. 3a;

FIG. 4a is a perspective view from above of the inlet box according to a second embodiment;

FIG. 4b is a view in cross section of the inlet box in FIG. 4a;

FIG. 5c depicts in a simplified manner a perspective view of the inlet channels of the inlet box in FIG. 5a;

FIG. 5d depicts in a simplified manner a view from above of the inlet channels in FIG. 5c;

FIG. 6 depicts in schematic form a perspective view illustrating the circulation of the fluid inside the inlet box in FIG. 5a and then around the cores of the heating modules according to a substantially helicoidal movement;

In these figures, the substantially identical elements carry the same reference designations.

Figure 1:
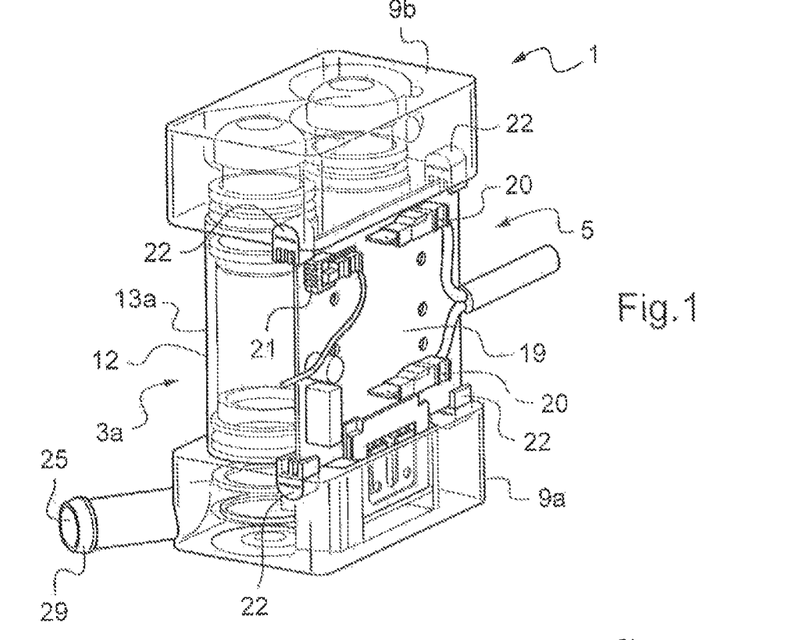
FIG. 1 depicts a perspective view of an electrical heating device for fluid for a motor vehicle according to the present invention, illustrated in part in transparent form.

FIG. 1 depicts a device for thermal conditioning such as an electrical heating device for fluid for a motor vehicle 1 for a heating and/or air conditioning apparatus.

The electrical heating device 1 is, for example, an additional heating device permitting a fluid to be heated prior to its entry into a circuit for heating a fluid intended for heating the interior of an electric vehicle.

According to another example, the electrical heating device 1 is disposed upstream of an evaporator of an air conditioning loop capable of functioning in heat pump mode in order to heat the refrigerant fluid.

According to yet another example, the electrical heating device 1 is arranged upstream of a heat exchanger utilizing the coolant of an internal combustion engine as a heat transfer medium.

Such an electrical heating device 1 could also be provided upstream of a heat exchanger intended for the thermal regulation of a storage device for electrical energy, sometimes referred to as a battery pack, intended for a vehicle with electric or hybrid propulsion.

The invention may also relate to a device permitting the cooling of a fluid.

The depicted electrical heating device 1 comprises:
a first heating module 3a and a second heating module 3b,
a control means 5 for controlling the electrical power supply to the heating modules 3a, 3b,
a fluid inlet, such as a fluid inlet box 9a, and
a fluid outlet 9b, such as a fluid outlet box 9b.

Provision can, of course, be made for the electrical heating device to comprise a single heating module or more than two heating modules, as required.

Figure 2:
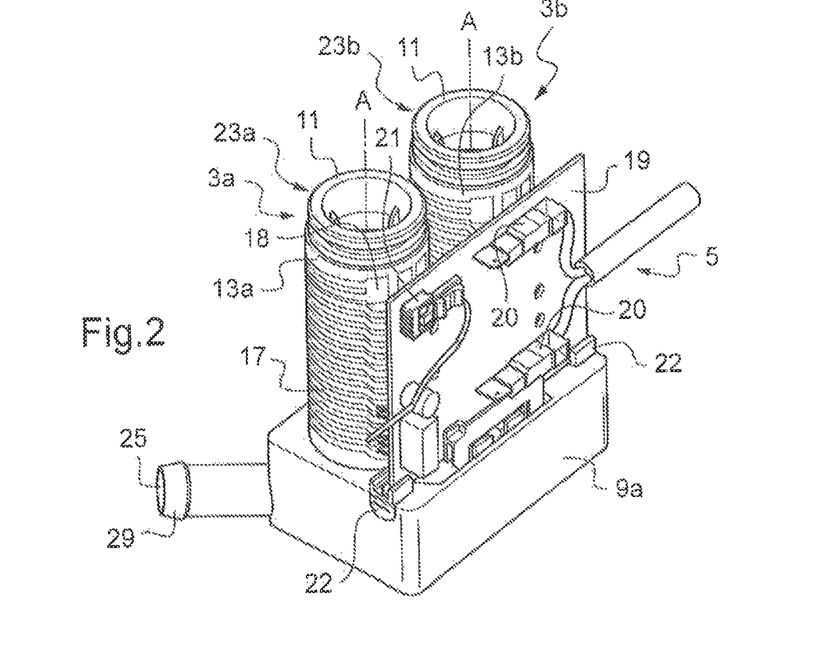
FIG. 2 depicts the electrical heating device in FIG. 1 illustrated in solid form, from which a fluid inlet box has been removed.

With reference to FIG. 2, a heating module 3a, 3b includes:
a core 11, and
a heating element 13a, 13b.

According to the illustrated example, a heating element 13a, 13b is realized in the form of a shell surrounding the body 12 of the core 11.

The core 11 and the heating element 13a, 13b are substantially cylindrical, for example, and extend in a longitudinal axis A.

The core 11 and the heating element 13a, 13b may be concentric.

A heating module 3a, 3b accordingly exhibits a substantially cylindrical general shape defined by the heating element 13a, 13b.

The core 11 and the heating element 13a, 13b define a circuit for guiding the fluid to be heated, such as liquid. The guiding circuit is defined around the external surface of the body 12 of the core 11, and it is accordingly situated outside the hub 11 and inside the heating element 13a or 13b. In other words, the external surface of the body 12 of the core 11 and the internal surface of the associated heating element 13a or 13b define a circulation volume for the fluid to be heated around the core 11. The fluid arriving from the fluid inlet box 9a may circulate in this circulation volume and may then continue towards the outlet box 9b.

According to the embodiment illustrated in FIGS. 1 and 2, each heating module 3a, 3b comprises a circuit for guiding the fluid between the core 11 and the respective heating element 13a, 13b.

Furthermore, the heating elements 13a, 13b are controlled by the control means 5 in order to heat the fluid by the exchange of heat between the heating elements 13a, 13b and the fluid circulating in the guiding circuit.

According to the illustrated embodiment, a heating element 13a, 13b exhibits at least one electrical means of heating such as a heating resistor 17. This heating resistor 17 may be realized in the form of a resistive track 17. According to the depicted illustrative embodiment, a heating element 13a, 13b exhibits two electrical means of heating that are realized in the form of two resistive tracks 17.

More precisely, the two resistive tracks 17 extend, for example, in parallel and at least partially for the height of the heating element 13a, 13b. The two resistive tracks 17 are, for example, embedded one inside the other or are intertwined.

The resistive tracks 17 are produced, for example, by screen printing onto the external surface of the heating element 13a, 13b, that is to say onto the surface opposite the internal surface of the heating element 13a, 13b with respect to the core 11. The resistive tracks 17 are thus situated outside the circuit for guiding the fluid to be heated.

Thanks to this embodiment, the heat produced by the resistor is transmitted directly to the fluid to be heated via the wall of the corresponding heating element 13a or 13b, which minimizes the thermal losses and reduces the thermal inertia of the device, and the fluid may therefore be heated rapidly.

The control means 5 controls the heating elements 13a, 13b by controlling the supply of power to the heating resistors 17, which are realized in this example in the form of resistive tracks 17.

For this purpose, the resistive tracks 17 are connected to the control means 5. In order to do this, connection terminals 18 connected electrically to the extremities of the resistive tracks 17 are provided. The control means 5 is connected electrically to these connection terminals 18.

In addition, a temperature sensor (not illustrated in the figures) may be provided in order to measure the temperature of an associated heating element 13a, 13b. This may be a thermistor, such as a "CTN" (Coefficient de Temperature Negatif) probe, or in English an "NTC" (Negative Temperature Coefficient) probe, of which the resistor decreases in a uniform manner with the temperature. This temperature sensor may be brazed or welded to the external surface of the associated heating element 13a, 13b.

In this case, the control means 5 controls the supply of power to the heating resistors depending on a heating setpoint and on the temperature measured by the temperature sensor.

This means 5 for controlling the heating element 13a, 13b includes an electrical circuit support 19 such as a printed circuit board (or PCB in English for "Printed circuit board"). This electrical circuit support 19 carries electronic and/or electrical components. These may include in particular one or a plurality of electric current circuit breakers for the purpose of controlling the power supply to the heating elements 13a, 13b.

In addition to the electric current circuit breakers, these electronic and/or electrical components may include, for example, the microcontroller, electrical connectors connecting the heating resistors 17 to the electric current circuit breakers, high voltage power connectors 20 and a low voltage power and data bus connector 21.

Provision may be made, in addition, for means 22 for positioning the electrical circuit support 19, such as snap-fastening means, for example arranged at the four corners of the electrical circuit support 19.

Furthermore, the heating modules 3a, 3b are identical, for example.

According to the illustrated embodiment, the two heating modules 3a, 3b are disposed side by side in a substantially parallel manner.

Other arrangements are, of course, conceivable, for example by disposing the two heating modules 3a, 3b end to end in the longitudinal sense of the heating modules 3a, 3b.

The side-by-side arrangement permits the space taken up by the heating device 1 to be reduced in the longitudinal direction. Furthermore, this arrangement exhibits a low thermal inertia and a low loss of pressure.

The heating modules 3a, 3b respectively exhibit two longitudinally opposite extremities: one inlet extremity 23a, 23b and one outlet extremity that are connected respectively to the inlet box 9a and to the outlet box 9b.

In order to do this, the cores 11 respectively include one inlet extremity 23a, 23b and one outlet extremity connected to the body 12 of the core 11.

As far as the fluid inlet box 9a is concerned, the latter comprises a fluid inlet channel 25 communicating with the guide circuit of the first heating module 3a and with the guide circuit of the second heating module 3b.

The fluid inlet channel 25 is configured so as to generate a swirling movement in the fluid ahead of the arrival of the fluid in the guide circuits of the heating modules 3a, 3b.

In order to do this, the inlet channel 25 exhibits at least one substantially curved portion in order to generate the swirling of the fluid.

More precisely, at least one wall delimiting this inlet channel 25 is substantially curved in such a way as to generate swirling of the fluid.

Figure 3A:
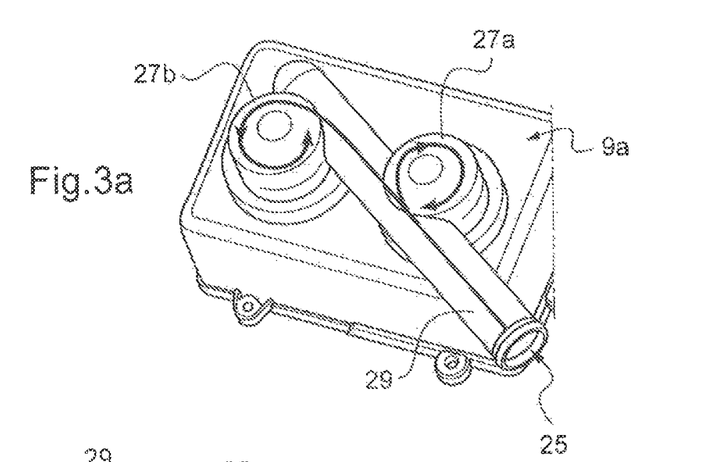
FIG. 3a is a view from above of the inlet box according to a first embodiment.
Figures 3B, 4A:
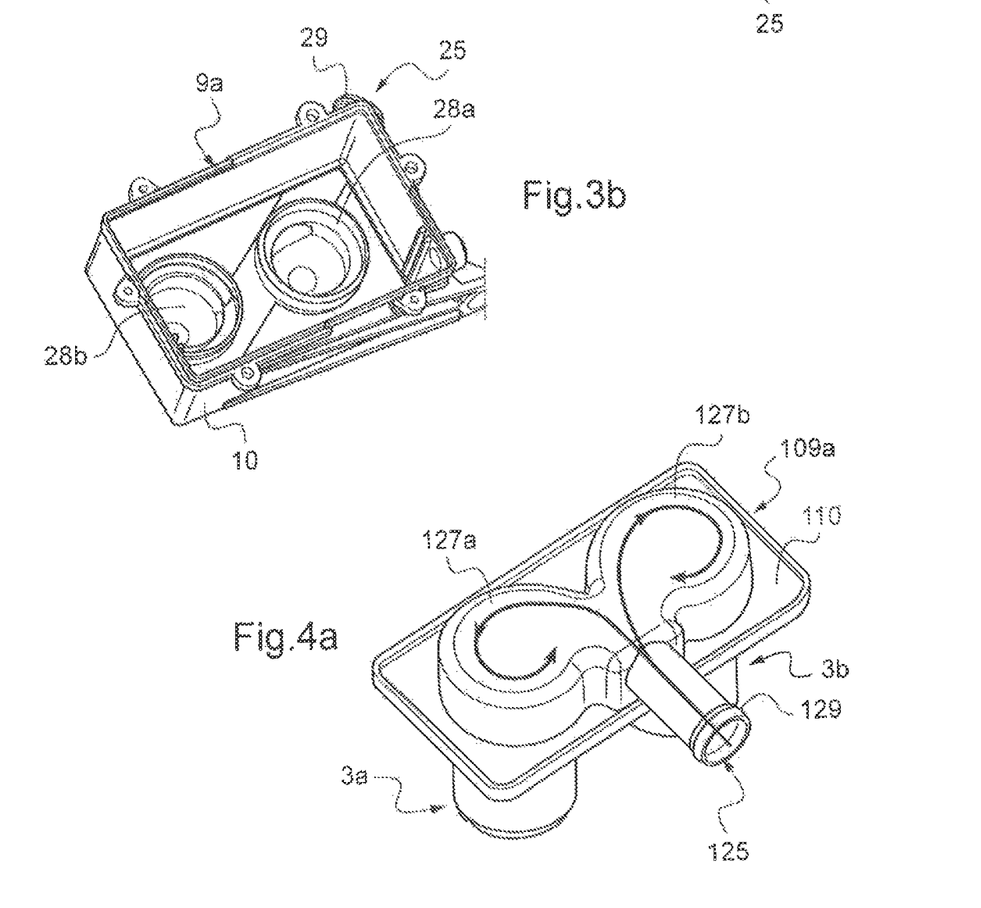

According to a first embodiment illustrated in FIGS. 1 and 3a, 3b, the fluid inlet box 9a exhibits a substantially parallelepipedic base 10 having two opposing large sides and two opposing small sides. This base is provided with a first feed bowl 27a and a second feed bowl 27b. These feed bowls 27a, 27b exhibit respectively a first cavity 28a and a second cavity 28b (see FIG. 3b) being of cylindrical form and having a spherical bottom in order to accommodate the respective inlet extremities 23a, 23b of the heating modules 3a, 3b.

The fluid inlet box 9a likewise includes a projecting fluid inlet manifold 29; this inlet manifold 29 is common to the two heating modules 3a, 3b.

According to this variant embodiment, the inlet manifold 29 is arranged in a manner tangential to the two feed bowls 27a and 27b.

The fluid inlet manifold 29 extends, for example, substantially diagonally in relation to the fluid inlet box 9a.

The inlet channel 25 is accordingly defined by the fluid inlet manifold 29 and the cavities 28a, 28b of the fluid inlet box 9a. The inlet channel 25 thus connects the inlet manifold 29 fluidly to the two cavities 28a, 28b of the feed bowls 27a, 27b of the fluid inlet box 9a.

According to this first variant, the inlet channel 25 is common to the two heating modules 3a, 3b as far as the point at which it opens into the two feed bowls 27a, 27b; the inlet channel 25 divides into two at the two cavities 28a, 28b. The two cavities This arrangement of the inlet manifold 29 and consequently a portion of the inlet channel 25 in a manner tangential to the feed bowls 27a, 27b, and the cylindrical shape of the cavity 28a, 28b of the feed bowls 27a, 27b, permits the generation of swirling of the fluid as depicted in a schematic manner by the arrows in FIG. 3a. The walls of the feed bowls 27a, 27b are curved as a result and delimit the extremity of the inlet channel 25 discharging into a guide circuit of a heating module 3a, 3b.

In a similar manner, a fluid outlet channel is formed in the fluid outlet box 9b and communicates with the guide circuit of the first heating module 3a and with the guide circuit of the second heating module 3b.

As can be appreciated in FIG. 1, the fluid outlet box 9b exhibits substantially the same shape as the fluid inlet box 9a. It thus exhibits a substantially parallelepipedic base exhibiting bowls provided with two cavities intended to accommodate the outlet extremities of the heating modules 3a, 3b and with a projecting fluid outlet manifold of the electric heating device 1 intended to be connected to a heated fluid circuit.

According to this example, the inlet 9a and outlet 9b boxes are connected symmetrically to the two opposing extremities of the heating modules 3a, 3b.

The flow of the fluid thus takes place from the fluid inlet manifold 29 of the inlet box 9a, in the inlet channel 25, then in parallel in the guide circuits of the heating modules 3a, 3b, before emerging into the outlet channel of the outlet box 9b and onwards via the outlet manifold.

As a result of the swirling generated in the fluid before its arrival in the guide circuits in the interior of the heating module 3a, 3b, the fluid follows a substantially helicoidal path without requiring the presence of a helicoidal groove or some other means arranged on the external surface of the core 11. In fact, the fluid is projected continuously onto the internal surface of the cylindrical envelope 13a, 13b.

Figure 4B:
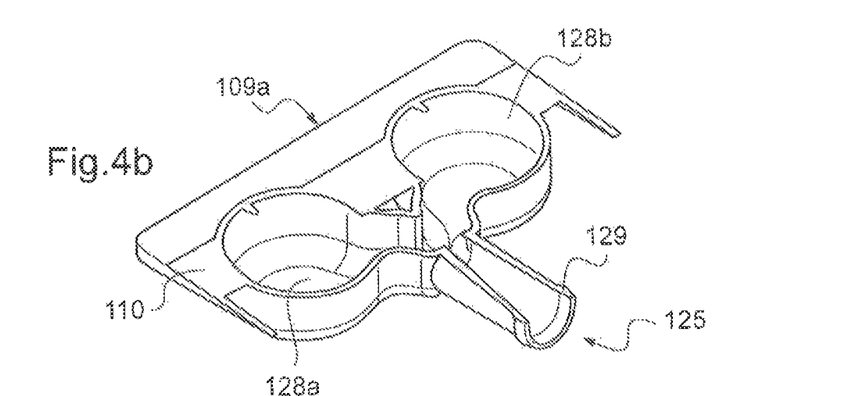

According to a second embodiment illustrated in FIGS. 4a and 4b, the fluid inlet box 109a exhibits a substantially parallelepipedic base 110 having two feed cylinders 127a, 127b exhibiting respectively a cavity 128a, 128b intended to accommodate the respective inlet extremities 23a, 23b of the heating modules 3a, 3b. The cavities 128a, 128b are thus substantially cylindrical.

The fluid inlet box 109a likewise includes a projecting fluid inlet manifold 129 that is common to the two heating modules 3a, 3b. According to the illustrated example, this inlet manifold 129 is arranged on one large side of the base 110 of the fluid inlet box 109a.

This second embodiment differs from the first embodiment depicted in FIGS. 3a, 3b by the fact that the inlet manifold 129 extends radially in relation to the longitudinal axis A of the heating modules 3a, 3b. The inlet manifold is thus arranged substantially perpendicularly to one side of the base 110 of the inlet box 109a. In addition, the inlet channel 125 divides into two in order to supply the two feed cylinders 127a, 127b respectively in parallel.

The cylindrical shape of the feed cylinders 127a, 127b permits the generation of a swirling of the fluid as depicted in a schematic manner by the arrows in FIG. 4a.

Of course, the fluid outlet box (not illustrated in FIGS. 4a, 4b) may be identical with the fluid inlet box 109a.

According to a third embodiment illustrated in FIGS. 5a to 7, the fluid inlet box 209a exhibits a substantially parallelepipedic base 210 provided with a first cavity 228a and a second cavity 228b, for example being of cylindrical shape and having a spherical bottom in order to accommodate the respective inlet extremities 23a, 23b of the heating modules 3a, 3b.

Figure 5A:
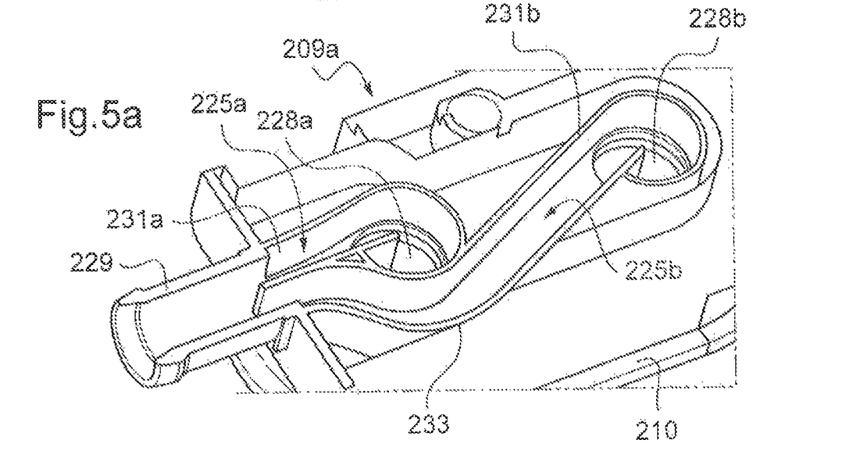
FIG. 5a is a view in cross section of the inlet box according to a third embodiment.

The fluid inlet box 209a likewise includes a projecting fluid inlet manifold 229 for the electrical heating device 1. This inlet manifold 229 extends radially in relation to the longitudinal axis A of the heating modules 3a, 3b. According to the illustrated example, the inlet manifold 229 is arranged on a small side of the base 210 of the fluid inlet box 209a and substantially perpendicular to this small side.

According to this third embodiment, the fluid inlet box 209a includes two inlet channels 225a and 225b connected fluidly on the one hand to the inlet manifold 229 and on the other hand to a respective cavity 228a, 228b of the fluid inlet box 209a.

The inlet channels 225a, 225b thus connect the common inlet manifold 229 fluidly to the two cavities 228a, 228b of the fluid inlet box 209a.

A first inlet channel 225a connects the inlet manifold 229 fluidly to the cavity 228a, and a second inlet channel 225b connects the same inlet manifold 229 to the other cavity 228b of the fluid inlet box 209a.

The first channel 225a is connected, for example, to the proximal cavity 228a, and the second channel 225b is connected to the distal cavity 228b. The notion of proximity is established in relation to the side on which the inlet manifold 229 is arranged.

For this purpose, a first conduit 231a and a second conduit 231b may be formed in the inlet box 209a and make it possible to define respectively the first inlet channel 225a and the second inlet channel 225b.

As a variant, these two conduits 231a, 231b may be realized in the form of an additional component part attached to the inlet box 209a. A component part as illustrated in FIG. 5c comprising a fluid inlet header 230 and two conduits 231a, 231b may be provided in this case. The fluid inlet header 230, for example, is common to the two conduits 231a, 231b and is realized integrally with these two conduits 231a, 231b.

Whereas the conduits 231a, 231b delimiting the inlet channels 225a, 225b are formed inside the inlet box 209a or are an additional component part, at least one inlet channel 225a, 225b is configured in such a way as to impart swirling to the fluid.

The swirling of the fluid is generated by the cylindrical shape of the cavities 228a, 228b.

Figure 5B:
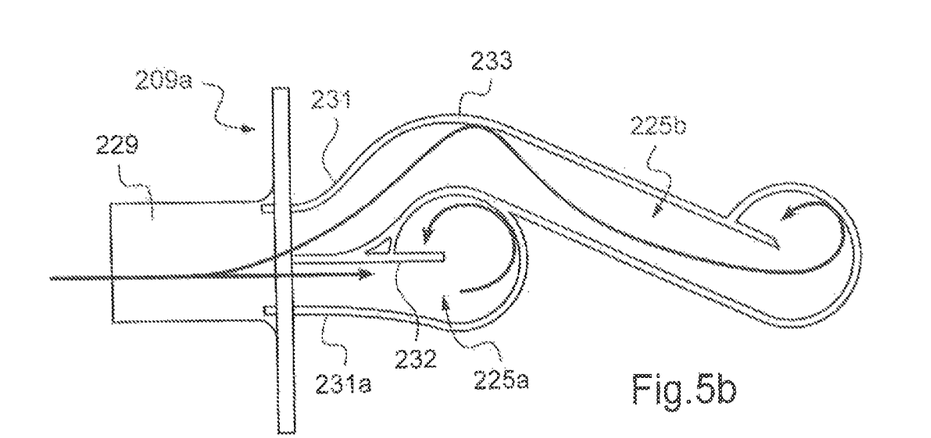
FIG. 5b depicts in schematic form the circulation of the fluid inside the inlet box in FIG. 5a in a view from above.
Figures 5C, 5D, 6:
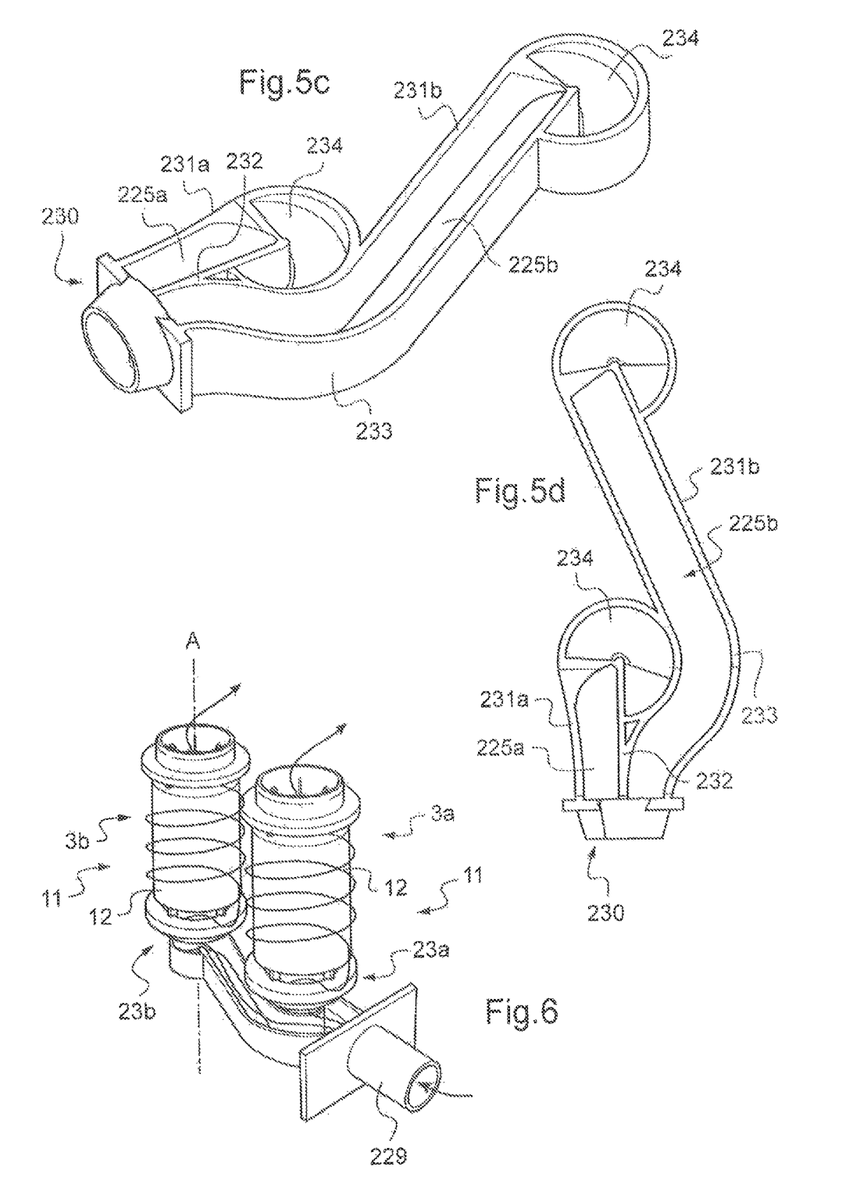

The movement of the fluid is depicted in a schematic manner by the arrows in FIG. 5b.

In addition, provision may be made for a conduit, for example the second conduit 231b defining the second inlet channel 225b, to exhibit a curved shape 233 such that the fluid is redirected when it comes up against this curved shape 233, as illustrated in a schematic manner by the arrows in FIG. 5b.

This curved shape 233 is adjacent to the rounded extremity of the first inlet channel 225a opening into a feed bowl of the inlet box 209a.

Furthermore, as can be appreciated in FIGS. 5c, 5d, a conduit 231a, 231b may include a substantially helicoidal guide ramp 234 for the fluid.

More precisely, this ramp 234 forms the start of a helix. The guide ramp 234 is arranged upstream of the inlet extremity 23a, 23b of the core 11. This ramp 234 thus forms a springboard for the flow of air, which permits the initiation of a helicoidal descending movement around the core 11.

Furthermore, as depicted schematically by the arrows in FIG. 6, this swirling movement continues along the core 11 of the heating modules 3a, 3b.

The fluid accordingly follows a substantially helicoidal trajectory without the need for helicoidal grooves on the external surface of the cores 11 of the heating modules 3a, 3b.

Figure 7:
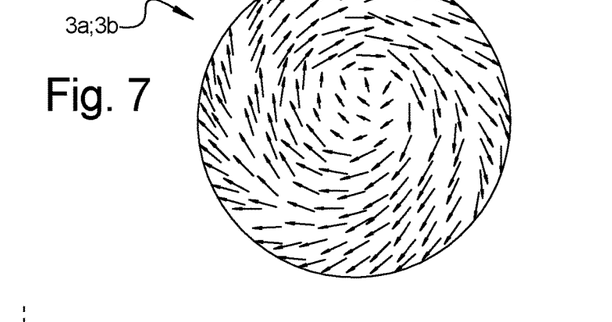
FIG. 7 is a view from above depicting in schematic form the swirling of the fluid at the inlet of a guiding circuit in a heating module in FIG. 6.

The swirling movement of the fluid at the inlet into a guide circuit of a heating module 3a, 3b is illustrated schematically by the arrows in FIG. 7.

In a manner similar to the inlet box 209a, the outlet box (not illustrated in FIGS. 5a to 7) may include conduits similar to the conduits 231a, 231b as described above, which may be integral with the outlet box or a component part attached to the outlet box.

Three embodiments of the inlet box 9a, 109a, 209a have been described previously, although the characterizing features of one embodiment may, of course, be combined with those of another embodiment.

Figures 8, 9:
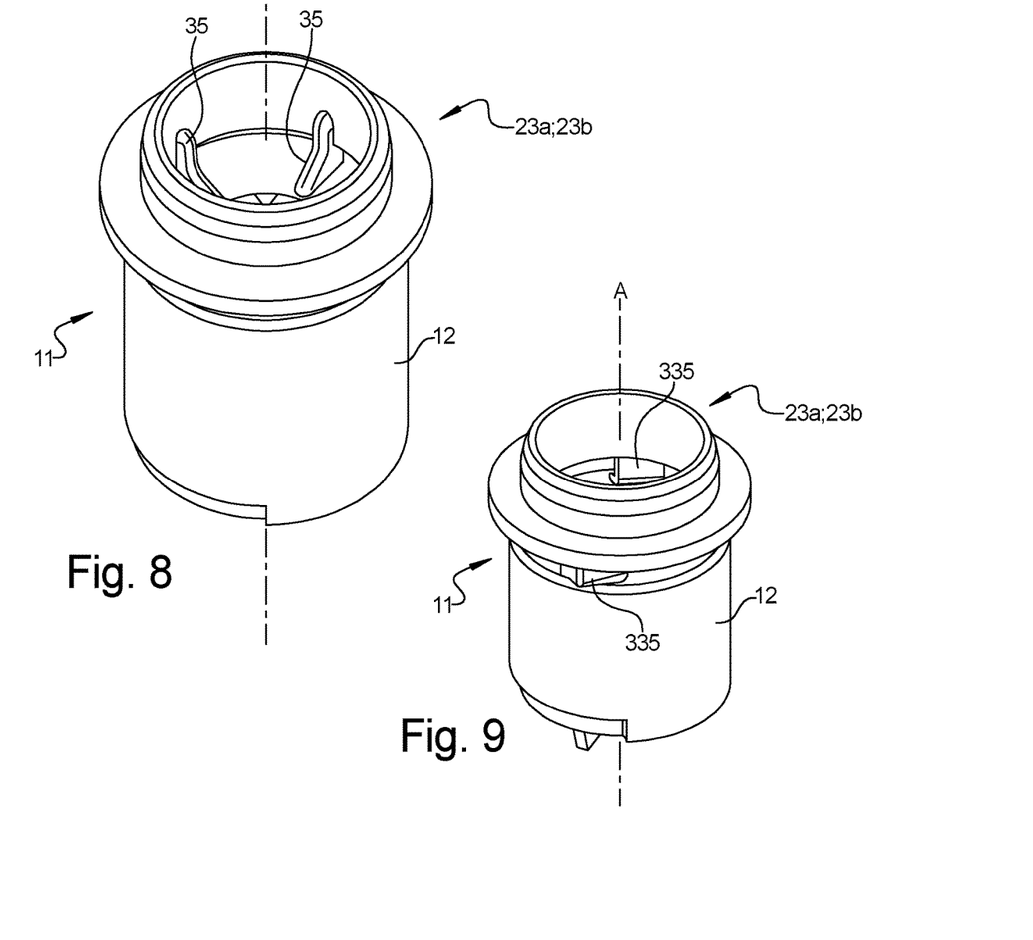
FIG. 8 is a partial view in perspective of a core of the heating module according to one embodiment.
FIG. 9 is a partial view in perspective of a core of the heating module according to a variant of the embodiment depicted in FIG. 8.

Furthermore, regardless of the embodiment of the inlet box 9a, 109a, 209a, deflectors 35 as illustrated in FIG. 8 may be provided forming a link between the body 12 of the core 11 permitting the definition of the guide circuit and the inlet extremity 23a, 23b of the core 11. The deflectors 35 may be distributed regularly according to a predefined stepping angle. The deflectors 35 may, of course, be distributed irregularly.

In a similar manner, such deflectors 35 may be provided between the body 12 of the core 11 and the outlet extremity.

According to the embodiment illustrated in FIG. 8, these deflectors 35 are part of the core 11. More precisely, these deflectors 35 may be realized integrally with the core 11.

In addition or as an alternative, the deflectors 35 may be arranged on the inlet box 9a, 109a, 209a and/or the outlet box 9b, 109b, 209b.

The fluid arriving via the inlet extremity 23a, 23b is directed towards the guide circuit defined between the external surface of the body 12 of the core 11 and the internal surface of the shell 13a, 13b and irrigates the whole of the guide circuit over its entire surface.

In a similar manner, after having circulated in the guide circuit, the fluid at the fluid outlet is directed towards the outlet extremity in such a way as to be evacuated via the outlet box 9b, 109b, 209b.

The deflectors 35 in this case are present in the trajectory of the fluid and thus form baffles 35 for disrupting the flow of the fluid.

These deflectors 35 may be arranged radially. More precisely, these deflectors 35 are oriented in a substantially radial manner in relation to the longitudinal axis A of a heating module 3a, 3b, as in the example illustrated in FIG. 8.

Furthermore, in the example illustrated in FIG. 8, the deflectors 35 exhibit a substantially triangular overall shape. The edges of the deflectors 35 are substantially rounded, for example.

According to a preferred alternative illustrated in FIG. 9, the deflectors 335 are so arranged as to extend in the direction of swirling of the fluid generated, as explained previously, by the shape of the inlet channel 25, 125, 225a, 225b.

These deflectors 335 are thus tangential to the direction of swirling of the fluid.

According to the example illustrated in FIG. 9, the deflectors 335 are realized in the form of substantially convex tongues, with their convexity oriented towards the exterior of the core 11.

The arrangement of the deflectors 335 in the direction of swirling of the fluid makes it possible to avoid "breaking" the swirling movement of the fluid generated upstream of the fluid guide circuit. As a result, the swirling of the fluid, in particular the helicoidal movement of the fluid, takes place along the guide circuit around the core 11. This prevents the fluid from circulating in a linear fashion in the guide circuit in a manner that is substantially parallel to the longitudinal axis A.

It is thus possible to create a swirling movement of the fluid "naturally", before the arrival of the fluid in the guide circuit between the core 11 and the cylindrical shell 13, without the contribution of helices produced, for example, in the form of a helicoidal groove on the external surface of the core 11.

This swirling may this be generated by the cylindrical shape of the cavities 28a, 28b, 128a, 128b of the feed bowls 27a, 27b, 127a, 127b and likewise thanks to a guide ramp 234 initiating the shape of a helix.

Finally, if deflectors 35, 335 are necessary in order to meet the specific needs between the feed bowls of the inlet box 9a, 109a, 209a and the cores 11 of the heating modules 3a, 3b, the shape of these deflectors 35, 335 must be provided in order not to disrupt the circulation of the fluid with the associated risk of cancelling out the swirling effect generated inside the inlet channel 25, 125, 225a, 225b. For this purpose, the deflectors 335 are preferably tangential to the generated direction of swirling.

The fluid thus follows a movement, for example ascending around the core 11, while maintaining the swirling generated upstream, and thus adopts a helicoidal movement making it possible to increase the thermal transfer between the heating element 13a, 13b and the fluid.

The various embodiments of the core 11 depicted in FIGS. 8 and 9 may, of course, be combinable with any embodiment depicted in FIGS. 1 to 7.

The invention claimed is:

1. A device for thermally conditioning a fluid for a motor vehicle, the device comprising:
    at least two thermal modules each comprising a core and a shell defining a circuit for guiding the fluid that is to be heated or cooled between the core and the shell;
    a fluid inlet box and a fluid outlet box, the fluid inlet box having at least one inlet channel for the fluid communicating with the guiding circuit for guiding the fluid,
    wherein the at least one inlet channel for the fluid has at least one substantially curved portion which is configured to generate a swirling movement in the fluid;
    wherein the at least two thermal modules are arranged side by side in parallel and two fluid inlet channels communicating respectively with the guiding circuit of the at least two thermal modules; and
    two conduits separated by a separating wall in such a way as to define the two fluid inlet channels.

2. The device as claimed in claim 1, in which the at least one inlet channel includes a guide ramp for the fluid of substantially helicoidal form around an axis that is substantially parallel to a longitudinal axis (A) of the at least two thermal modules.

3. The device as claimed in claim 1, in which the at least one inlet channel exhibits a shape that is substantially in the form of an elbow.

4. The device as claimed in claim 1, in which the fluid inlet box comprises at least one feed bowl having a substantially cylindrical shape fluidly connected to the guiding circuit of the at least two thermal modules.

5. The device as claimed in claim 4, wherein the at least one inlet channel exhibits a portion that is tangential to two feed bowls of the fluid inlet box.

6. The device as claimed in claim 1, in which the two conduits respectively include an extremity communicating fluidly with an associated guiding circuit for guiding the fluid and exhibiting a guide ramp for the fluid of substantially helicoidal form around an axis that is substantially parallel to a longitudinal axis (A) of the at least two thermal modules.

7. The device as claimed in claim 1, in which the two conduits exhibit a common fluid inlet header, and in which the two conduits and the common fluid inlet header are realized integrally with the fluid inlet box.

8. The device as claimed in claim 1, in which the two conduits are formed integrally with the fluid inlet box.

9. The device as claimed in claim 1, in which the fluid inlet box exhibits a fluid inlet manifold arranged radially in relation to a longitudinal axis (A) of the at least two thermal modules.

10. The device as claimed in claim 1, in which the core of each of the at least two thermal modules includes a core body, defined around which is the guiding circuit for guiding the fluid and an inlet extremity accommodated inside a cavity of the fluid inlet box, and in which the device further comprises deflectors disposed between the core body and the inlet extremity of the core.

11. The device as claimed in claim 10, in which the deflectors are arranged radially in relation to a longitudinal axis (A) of the at least two thermal modules.

12. The device as claimed in claim 10, in which the deflectors are arranged in the direction of swirling of the fluid generated by the fluid inlet channel.

13. The device as claimed in claim 10, in which the deflectors are realized integrally with the core.

14. The device as claimed in claim 10, in which the fluid inlet box comprises the deflectors.

15. The device as claimed in claim 1, arranged in a circuit for heating an interior of the motor vehicle.

16. A heating and/or air conditioning apparatus for a motor vehicle, comprising at least one thermal conditioning device as claimed in claim 1.

* * * * *